United States Patent
Doumecq-Lacoste et al.

(10) Patent No.: US 9,624,785 B2
(45) Date of Patent: Apr. 18, 2017

(54) SYSTEM FOR MONITORING HEALTH OF A SEAL

(71) Applicant: Solar Turbines Inc., San Diego, CA (US)

(72) Inventors: Julien Doumecq-Lacoste, Billere (FR); Ricardo Montes, San Diego, CA (US); Roy T. Collins, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 618 days.

(21) Appl. No.: 14/163,808

(22) Filed: Jan. 24, 2014

(65) Prior Publication Data

US 2015/0211379 A1    Jul. 30, 2015

(51) Int. Cl.
| | |
|---|---|
| *F04D 27/02* | (2006.01) |
| *F01D 21/00* | (2006.01) |
| *F16K 31/06* | (2006.01) |
| *G01M 3/00* | (2006.01) |
| *G01M 3/28* | (2006.01) |
| *F01D 25/18* | (2006.01) |

(52) U.S. Cl.
CPC ......... *F01D 21/003* (2013.01); *F01D 25/186* (2013.01); *F16K 31/0644* (2013.01); *G01M 3/00* (2013.01); *G01M 3/2869* (2013.01); *F05D 2260/80* (2013.01)

(58) Field of Classification Search
CPC .. F01D 21/003; F01D 25/186; G01M 3/2869; G01M 3/30; F16K 31/0644; F05D 2260/80

USPC ......................................... 277/317, 318, 320
See application file for complete search history.

(56) References Cited

U.S. PATENT DOCUMENTS

| | | | |
|---|---|---|---|
| 5,412,977 A * | 5/1995 | Schmohl | ................. F01D 11/06 277/318 |
| 6,345,954 B1 * | 2/2002 | Al-Himyary | ......... F04D 29/122 277/318 |
| 6,524,059 B1 | 2/2003 | Nogiwa | |
| 6,626,436 B2 * | 9/2003 | Pecht | .................. G01M 13/005 277/317 |
| 6,802,689 B2 | 10/2004 | Nogiwa | |
| 7,752,833 B2 | 7/2010 | Feiz | |
| 8,348,633 B2 | 1/2013 | Adams et al. | |
| 8,438,930 B2 | 5/2013 | Rogers et al. | |

(Continued)

FOREIGN PATENT DOCUMENTS

| | | |
|---|---|---|
| JP | 04-029678 | 1/1992 |
| JP | 04-187897 | 7/1992 |

(Continued)

*Primary Examiner* — Nicholas J Weiss
*Assistant Examiner* — Jason T Newton
(74) *Attorney, Agent, or Firm* — Procopio, Cory, Hargreaves & Savitch, LLP (57) ABSTRACT

A system for monitoring a health of one or more seals includes a flow control valve, and a controller. The flow control valve is located upstream of the seal and disposed in fluid communication therewith. The flow control valve is configured to maintain a pre-determined fluid pressure between the flow control valve and the seal. The controller is communicably coupled to the flow control valve. The controller is configured to receive a position of the flow control valve, and determine the health of the seal based on the received position of the flow control valve.

19 Claims, 3 Drawing Sheets

(56) References Cited

U.S. PATENT DOCUMENTS

| | | | | |
|---|---|---|---|---|
| 8,564,237 B2* | 10/2013 | Bandaru | ................. | G01M 3/22 |
| | | | | 310/53 |
| 2009/0290971 A1* | 11/2009 | Shamseldin | .......... | F04D 29/124 |
| | | | | 415/1 |
| 2012/0017674 A1* | 1/2012 | Kumar | ................... | B82Y 30/00 |
| | | | | 73/152.54 |
| 2012/0143519 A1* | 6/2012 | Schenk | ................. | F16J 15/064 |
| | | | | 702/34 |
| 2012/0279290 A1 | 11/2012 | Malone | | |
| 2013/0031960 A1* | 2/2013 | Delrahim | ................ | F01D 11/06 |
| | | | | 73/40.5 R |
| 2013/0170961 A1 | 7/2013 | Meucci | | |
| 2013/0195649 A1 | 8/2013 | Kitano et al. | | |
| 2015/0149100 A1* | 5/2015 | Eisenbeis | ............... | G01B 7/003 |
| | | | | 702/58 |

FOREIGN PATENT DOCUMENTS

| | | |
|---|---|---|
| WO | 2012058069 | 5/2012 |
| WO | 2013083437 | 6/2013 |

* cited by examiner

SYSTEM FOR MONITORING HEALTH OF A SEAL

TECHNICAL FIELD

The present disclosure relates to a system for monitoring a health of a sealing component configured to interface with a fluid, and more particularly to a system for monitoring the health of a gas seal.

BACKGROUND

Sealing assemblies may be provided in compressors to seal a process fluid, for example, natural gas, and prevent the process fluid from exiting the compressor at locations other than a designated exit. Further, the compressor may include a pair of bearings which permit a shaft to be supported and rotated about its axis. In some cases, these sealing assemblies may be additionally configured to prevent the process fluid from mixing into a lubricant associated with the bearings. Such sealing assemblies typically operate under high pressures and may be prone to deterioration over time.

Japanese Publication No. 04-187897 (hereinafter referred to as '897 publication) discloses that a leakage of gas inside a compressor from a dry-seal is prevented by charging a buffer gas whose pressure is higher than that in the compressor. To prevent oil inside a bearing from flowing into the dry-gas seal, instrumental air for air-sealing is charged into a chamber. A chamber is provided between the chamber and the vent line of the dry-seal, and this is connected to a safe nitrogen gas line. Normally, a solenoid valve is closed, and at the time of abnormality, it is opened to introduce nitrogen gas whose pressure is higher than the gas pressure inside the system, and the dangerous gas leaked from the dry-gas seal is discharged to a safe place through the vent line. However, the '897 publication does not disclose monitoring of a health or deterioration of the dry-seal to allow timely replacement or other service routines on the dry-seal.

SUMMARY

In one aspect, the present disclosure provides a system for monitoring a health of one or more seals. The system includes a flow control valve, and a controller. The flow control valve is located upstream of the seal and disposed in fluid communication therewith. The flow control valve is configured to maintain a pre-determined fluid pressure between the flow control valve and the seal. The controller is communicably coupled to the flow control valve. The controller is configured to receive a position of the flow control valve, and determine the health of the seal by comparing the received position of the flow control valve with a historical position of the flow control valve corresponding to the pre-determined fluid pressure.

In another aspect, the present disclosure provides a method of monitoring a health of one or more seals. The method includes providing a flow control valve in fluid communication with the seal. The method further includes measuring a fluid pressure between the flow control valve and the seal. The method further includes receiving a position of the flow control valve corresponding to the measured fluid pressure. The method further includes determining the health of the seal by comparing the received position of the flow control valve with a historical position of the flow control valve corresponding to the pre-determined pressure.

In another aspect, the present disclosure provides a system for monitoring a health of one or more seals. The system includes a vent line disposed in fluid communication with the seal. The system further includes a pressure transducer disposed in the vent line. The pressure transducer is configured to measure fluid pressure in the vent line. The system further includes a flow control valve located downstream of the pressure transducer. The flow control valve is configured to maintain a pre-determined fluid pressure in the vent line. The system further includes a controller communicably coupled to the flow control valve. The controller is configured to receive a position of the flow control valve. The controller is further configured to determine the health of the seal based on the received position of the flow control valve, wherein a change in the position of the flow control valve is indicative of a change in a state of the health of the seal.

Other features and aspects of this disclosure will be apparent from the following description and the accompanying drawings.

DETAILED DESCRIPTION

Figure 1:
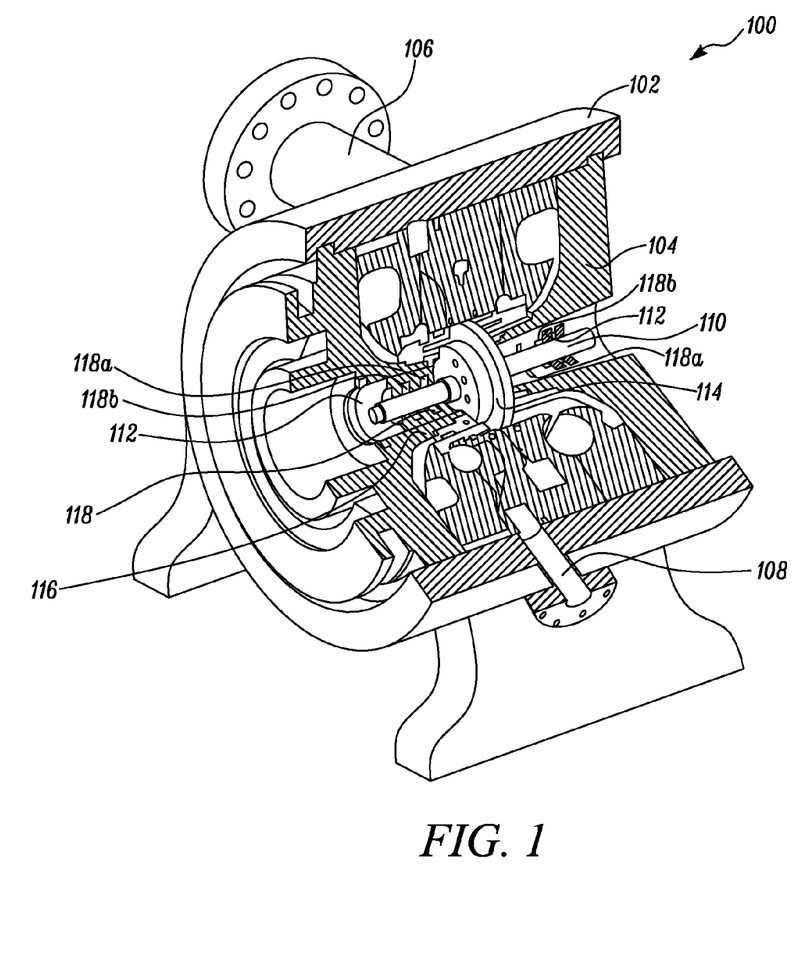
FIG. 1 is a breakaway view of an exemplary turbo fluid machine, in accordance with an embodiment of the present disclosure.

The present disclosure relates to a system for monitoring a health of a component configured to interface with a fluid, and more particularly to a system for monitoring the health of a seal. FIG. 1 shows a schematic view of an exemplary turbo fluid machine 100 in which disclosed embodiments may be implemented. The turbo fluid machine 100 may be of any type. In an exemplary embodiment as shown in FIG. 1, the turbo fluid machine 100 may embody a compressor, for example, an axial flow compressor, a rotary screw compressor, or a centrifugal compressor. Further, the compressor may be a single stage compressor or a multistage compressor. However, in alternative embodiments, the turbo fluid machine 100 may embody any other type or configuration of machine typically known in the art to handle one or more process fluids under pressure. The process fluid disclosed herein may be a liquid or a gas, but is not limited thereto.

As shown in FIG. 1, the turbo fluid machine 100 may include a shroud 102. The turbo fluid machine 100 may include a housing 104 disposed within the shroud 102. The housing 104 defines an inlet 106 and an outlet 108. Process fluid may enter the housing 104 via the inlet 106 and exit the housing 104 via the outlet 108.

The turbo fluid machine 100 may further include a shaft 110 extending longitudinally within the housing 104 and rotatably supported by one or more bearings 112. The turbo fluid machine 100 may further include a rotor 114 and a stator 116. The rotor 114 may be rigidly supported on the shaft 110 while the stator 116 may be rigidly disposed within the housing 104. The rotor 114 may be configured to rotate relative to the stator 116 for compression of the process fluid.

The turbo fluid machine 100 may further include multiple seals 118 disposed on the shaft 110 and located adjacent to the bearings 112. In an embodiment, at least one seal 118 from amongst the seals 118 may be a dry gas seal. The gas seals 118, disclosed herein, may be of a type commonly known in the art.

In a specific embodiment of the present disclosure, two sets of seals 118 may be employed. Each set of seals 118 may include a primary gas seal 118a and a secondary gas seal 118b. The primary gas seals 118a may be located adjacent to the outlet 108 and the inlet 106 of the housing 104 while the secondary gas seals 118b may be located between the respective primary gas seal 118a and the bearings 112.

Figure 2:
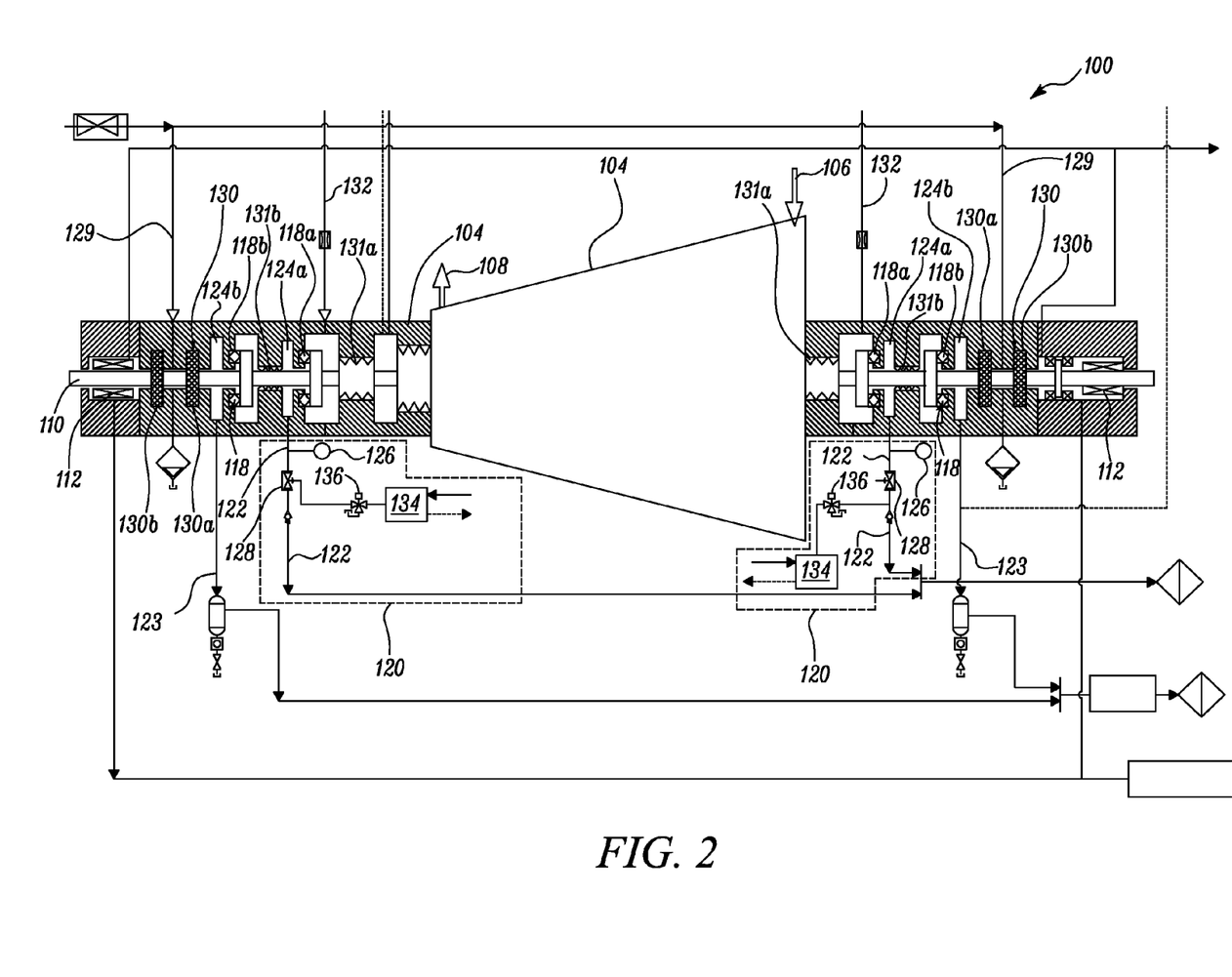
FIG. 2 is a schematic view of the exemplary turbo fluid machine of FIG. 1 including multiple seals therein and employing the system of the present disclosure to monitor a health of the seals.

Referring to a schematic representation of the exemplary turbo fluid machine 100 in FIG. 2, the machine 100 may further include a seal gas supply line 132 for supplying seal gas to the primary gas seal 118a. The seal gas may be, for example, cleaned process gas (process gas that is free from contamination and moisture) or pure nitrogen ($N_2$). The supplied seal gas may facilitate operation of the primary gas seal 118a and the secondary gas seal 118b during operation of the machine 100. A pressure of the supplied seal gas may be higher than a pressure of the process fluid in the housing 104. Therefore, the primary and secondary gas seals 118a, 118b together with the seal gas disclosed herein may be configured to prevent the process fluid of the turbo fluid machine 100 from mixing with a lubricant associated with the bearings 112 and/or migrating into a lube oil tank (not shown).

In an embodiment as shown in FIG. 2, the seal gas is configured to enter adjacent to the primary gas seal 118a. Typically, a fraction of the supplied seal gas may leak across the primary gas seal 118a due to an operating gap in the primary gas seal 118a. Therefore, during operation of the primary gas seal 118a, the leaked seal gas may move past the primary gas seal 118a to enter a primary vent chamber 124a located between the primary gas seal 118a and the secondary gas seal 118b.

Similarly, a fraction of the leaked seal gas present in the primary vent chamber 124a may further leak across the secondary gas seal 118b to enter a secondary vent chamber 124b located downstream of the secondary gas seal 118b. Thereafter, the seal gas may exit into a secondary vent line 123 located further downstream of the secondary gas seal 118b. However, during operation of the machine 100, most part of the seal gas is typically returned to become part of the process gas.

With continued reference to FIG. 2, the machine 100 may optionally include a first labyrinth seal 131a and a second labyrinth seal 131b. The first labyrinth seal 131a may be located between the housing 104 and the primary gas seal 118a while the second labyrinth seal 131b may be interposed between the primary and secondary gas seals 118a, 118b. The seal gas supply line 132 located adjacent to the first labyrinth seal 131a and the primary gas seal 118a is configured to supply pressurized seal gas such that the pressurized seal gas prevents process gas from migrating across the primary gas seal 118a and subsequently the secondary gas seal 118b.

Further, as shown in the exemplary embodiment of FIG. 2, the machine 100 may additionally include one or more separation seals 130. The separation seals may be interposed between the secondary gas seal 118 and the bearings 112. These separation seals 130 may be of a type different from that of the primary and secondary gas seals 118a, 118b. For example, the separation seals 130 may be of a carbon ring type or a labyrinth type as commonly known to a person ordinarily skilled in the art.

In the specific embodiment of FIG. 2, two separation seals 130, namely—the first separation seal 130a and the second separation seal 130b may be disposed between the secondary gas seal 118 and the bearings 112. The machine 100 may further include a buffer gas line 129 for supplying buffer gas to the first and second separation seals 130a, 130b. Typically, gases such as, for example, clean dry air, or nitrogen ($N_2$) that is free from contamination and moisture may be used to form the buffer gas.

The buffer gas may be supplied between the first and second separation seals 130a, 130b via the buffer gas line 129 to occupy a space between the first and second separation seals 130a, 130b. A pressure of the supplied buffer gas may be higher than atmospheric pressure and a pressure of the lubricant. Thus, the buffer gas may additionally provide restriction to the flow of the seal gas past the first separation seal 130a. Therefore, the separation seals 130a, 130b may be beneficially installed in addition to the gas seals 118a, 118b to minimize the possibility of the process fluid from mixing into the lubricant associated with the bearings 112 of the machine 100. Further, when associated system hardware associated with the labyrinth seals 131a, 131b is provided and an intermediate inert seal gas, typically N2, is supplied, the labyrinth seals 131a, 131b will additionally prevent leaked seal gas in the primary vent chamber 124a from exiting through the secondary vent line 123.

Moreover, leakage of seal gas across the primary gas seal 118a and/or the secondary gas seal 118b may be depend on factors such as, but are not limited to, gas viscosity, gas temperature, rotational speed of the shaft 110, pressure in the seal gas supply line 132, diameter of the primary gas seal 118a, flatness of the seal faces, bevel angle of the faces, and groove depth on the gas seals 118a, 118b. Therefore, a person having ordinary skill in the art may acknowledge that the pressure of the seal gas in the primary vent chamber 124a may vary as a function of the aforementioned factors.

However, with regards to the present disclosure and for optimal performance of the primary and secondary gas seals 118a, 118b, it is envisioned to have a pre-determined pressure of the seal gas in the primary vent chamber 124a so that respective operating or working gaps are maintained in the primary gas seal 118a and the secondary gas seal 118b.

The turbo fluid machine 100, disclosed herein, employs a system 120 for monitoring the health of the seals 118. The term "health" disclosed herein refers to a remnant service life of the seals 118. For example, 50% health of the seals 118 may represent that 50% of service life is remaining in the seals 118. In the specific embodiment of FIG. 2, the system 120 may be configured to monitor the health of the secondary gas seal 118b.

Although the specification is in conjunction with the monitoring of health of the secondary gas seal 118b, it must be noted that a scope of the present disclosure is not limited to monitoring the health of the secondary gas seal 118b, but may extend to the primary gas seal 118a or other seals disclosed herein. For purposes of explanation and ease in understanding of the present disclosure, the term "seal" from the appended claims may be construed to represent the secondary gas seal 118b disclosed herein. Therefore, in alternative embodiments, the system 120 may be configured to monitor the health of any specified seal from amongst a group of seals depending on specific requirements of an application. For example, the system 120 may be configured to monitor a health of the primary gas seal 118a, the secondary gas seal 118b, a tertiary gas seal and so on.

In an embodiment as shown in FIG. 2, the system 120 includes a vent line 122 disposed in fluid communication with the secondary gas seal 118b. As shown in FIG. 2, the vent line 122 is located upstream of the secondary gas seal 118b and is located downstream with respect to the primary gas seal 118a. The vent line 122 is disposed in fluid communication with the primary and secondary gas seals 118a, 118b via the primary vent chamber 124a.

The system 120 further includes a pressure transducer 126 disposed in the vent line 122. The pressure transducer 126 is configured to measure fluid pressure in the vent line 122. The pressure transducer 126 may be of a type commonly known in the art. Some examples of pressure transducers may include, but are not limited to, a pressure gauge, or a pressure transmitter.

The system 120 further includes a flow control valve 128 located upstream of the secondary gas seal 118b and disposed in fluid communication therewith. As shown in FIG. 2, the flow control valve 128 is located downstream of the primary gas seal 118a and the pressure transducer 126. The flow control valve 128 is configured to maintain a pre-determined fluid pressure in the vent line 122 i.e. in the primary vent chamber 124a located between the flow control valve 128 and the primary gas seal 118a. For example, the flow control valve 128 may be configured to maintain a pre-determined pressure of 70 pounds per square inch (psi) as measured by the pressure transducer 126.

Leakage of seal gas across the secondary gas seal 118b may cause a pressure drop in the primary vent chamber 124a. However, as disclosed earlier herein, the flow control valve 128 is configured to maintain the pre-determined fluid pressure of the seal gas in the primary vent chamber 124a. The flow control valve 128 may operatively account for the aforementioned factors and accordingly maintain the pressure of seal gas in the primary vent chamber 124a at the pre-determined fluid pressure. Under normal circumstances, the pre-determined fluid pressure, disclosed herein, may be typically less than a seal gas pressure in the seal gas supply line 132.

The system 120 further includes a controller 134 communicably coupled to the flow control valve 128. In an embodiment, the controller 134 may be configured to actuate the flow control valve 128 to maintain the pre-determined fluid pressure in the vent line 122 and the primary vent chamber 124a. In another embodiment, the system 120 may further include a solenoid 136 communicably coupled to the controller 134 and the flow control valve 128. The controller 134 may be configured to actuate the flow control valve by actuating the solenoid 136.

The controller 134 is configured to receive a position of the flow control valve 128 and determine the health of the secondary gas seal 118b based on the received position of the flow control valve 128. In an embodiment of the present disclosure, the controller 134 may compare the received position of the flow control valve 128 with a historical position of the flow control valve 128 corresponding to the pre-determined fluid pressure.

The historical position, disclosed herein, may be a position of the flow control valve 128 previously known or determined for a given fluid pressure in the vent line 122 and the primary vent chamber 124a. The historical position may be stored in the controller 134 as pre-calculated or known data in the form of tables, curves, graphs obtained from various theoretical models, statistical models, simulated models, or any combinations thereof.

Alternatively, the historical position disclosed herein may be experimental data, or data obtained from actual trial runs of the turbo fluid machine 100 at varying health conditions of the secondary gas seal 118b, for example, at full health and partial health of the secondary gas seal 118b. Full health disclosed herein may represent a 100% health of the secondary gas seal 118b i.e., when a sealing force associated with the secondary gas seal 118b is maximum. Partial health may represent a health condition of the secondary gas seal 118b in which the sealing force is less than a maximum sealing force of the secondary gas seal 118b.

With reference to various embodiments of the present disclosure, it is to be noted that a change in the position of the flow control valve 128 is indicative of a change in the health of the secondary gas seal 118b. If a position of the flow control valve 128 received at the controller 134 corresponds to or matches with a historical position of the flow control valve 128 for a given pre-determined fluid pressure in the vent line 122 or the primary vent chamber 124a, the controller 134 may be configured to infer that there is no deterioration in the health of the secondary gas seal 118b. Therefore, the controller 134 may indicate that the secondary gas seal 118b is functioning normally and/or meets the pressure requirements associated with the application.

Referring to the specific embodiment shown in FIG. 2, if a position of the flow control valve 128 remains unchanged and corresponds with the historically known position, it may imply that the secondary gas seal 118b is functioning with its maximum sealing capacity.

However, if there is a change in the health of the secondary gas seal 118b a fluid pressure in the primary vent chamber 124a and the vent line 122 may tend to decrease. Simultaneously, the flow control valve 128 is configured to a position different from the historical position for the given pre-determined pressure. Therefore, the flow control valve 128 is configured to prevent the decrease of fluid pressure in the primary vent chamber 124a.

Further, the controller 134 may receive the position of the flow control valve 128 and determine the health of the secondary gas seal 118b based on the received position of the flow control valve 128. To this effect, as disclosed in an embodiment herein, the controller 134 may compare the received position of the flow control valve 128 with the historical position and determine the health of the secondary gas seal 118b.

For example, if the health of the secondary gas seal 118b has deteriorated and the secondary gas seal 118b functions at 50% of its rated sealing capacity, then a pressure of the seal gas in the vent line 122 and the primary vent chamber 124a may tend to decrease to 50% of the pre-determined fluid pressure value that should be maintained in the primary vent chamber 124a. Since a position of the flow control valve 128 is simultaneously re-configured or changed to a new position, a decrease in the fluid pressure in the primary vent chamber 124a may be prevented to maintain the pre-determined pressure value in the vent line 122 and the primary vent chamber 124a. Thereafter, the controller 134 receives the new position of the flow control valve 128 corresponding to the pre-determined pressure. Further, the controller 134 compares the received new position of the flow control valve 128 with the historical position and determines that the health of the secondary gas seal 118b has deteriorated by 50% of its maximum rated health.

Although the foregoing disclosure has been described in conjunction with the secondary gas seal 118b, systems and methods of the present disclosure may be equally applied for monitoring the health of the primary gas seal 118a.

For example, if the health of the primary gas seal 118a has deteriorated and the primary gas seal 118a functions at 50% of its rated sealing capacity, then a pressure of the seal gas in the primary vent chamber 124a and the vent line 122 may tend to increase to 150% of the pre-determined fluid pressure value that should be maintained in the primary vent chamber 124a. Since a position of the flow control valve 128 is simultaneously re-configured or changed to a new position upon deterioration of the primary gas seal 118a, an increase in the fluid pressure in the primary vent chamber 124a may be prevented to maintain the pre-determined pressure value in the vent line 122 and the primary vent chamber 124a. Thereafter, the controller 134 receives the new position of the flow control valve 128 corresponding to the pre-determined pressure. Further, the controller 134 compares the received new position of the flow control valve 128 with the historical position and determines that the health of the primary gas seal 118b has deteriorated by 50% of its maximum rated health.

However, if a position of the flow control valve 128 remains unchanged and corresponds with the historically known position, it may imply that the primary gas seal 118a is functioning with its maximum sealing capacity. Therefore, referring to the specific embodiment shown in FIG. 2, the system 120 of the present disclosure may be configured to monitor the health of the primary gas seal 118a. It may now be evident from the foregoing disclosure that the system 120 may be employed to monitor the health of the primary gas seal 118a and the secondary gas seal 118b either individually or collectively depending on the change in the position of the flow control valve 128. Therefore, references or explanation made in conjunction with the secondary gas seal 118b should not be construed as limiting of this disclosure, but rather a scope of this disclosure also extends to include monitoring of the health of the primary gas seal 118a as disclosed herein.

All directional references (e.g. upstream, downstream, upward, downward, top, bottom, upper, lower, forward, backward, adjacent, and the like) disclosed herein are used only for identification purposes to aid the reader's understanding of the present disclosure and hence, may not create limitations, particularly as to the position, orientation, or use of the devices and/or methods disclosed herein.

Additionally, all numerical terms, such as, but not limited to, "first", "second", "third", "primary", "secondary", "tertiary", or other numerical terms should also be taken as identifiers to assist the reader's understanding of the various components, embodiments and/or variations of the present disclosure. Therefore, the numerical terms disclosed herein may not create any limitations, particularly as to the order, or preference, of any component, embodiment, or variation relative to, or over, another component, embodiment, and/or variation.

Similarly, adjectives and/or verbs such as, but not limited to, "communicably coupled", "fluidly coupled", "disposed in fluid communication with" and the like should be construed broadly, and only as nominal. The adjectives and/or verbs disclosed herein may not create any limitations, particularly as to the description, operation, or use unless specifically set forth in the claims.

INDUSTRIAL APPLICABILITY

Figure 3:
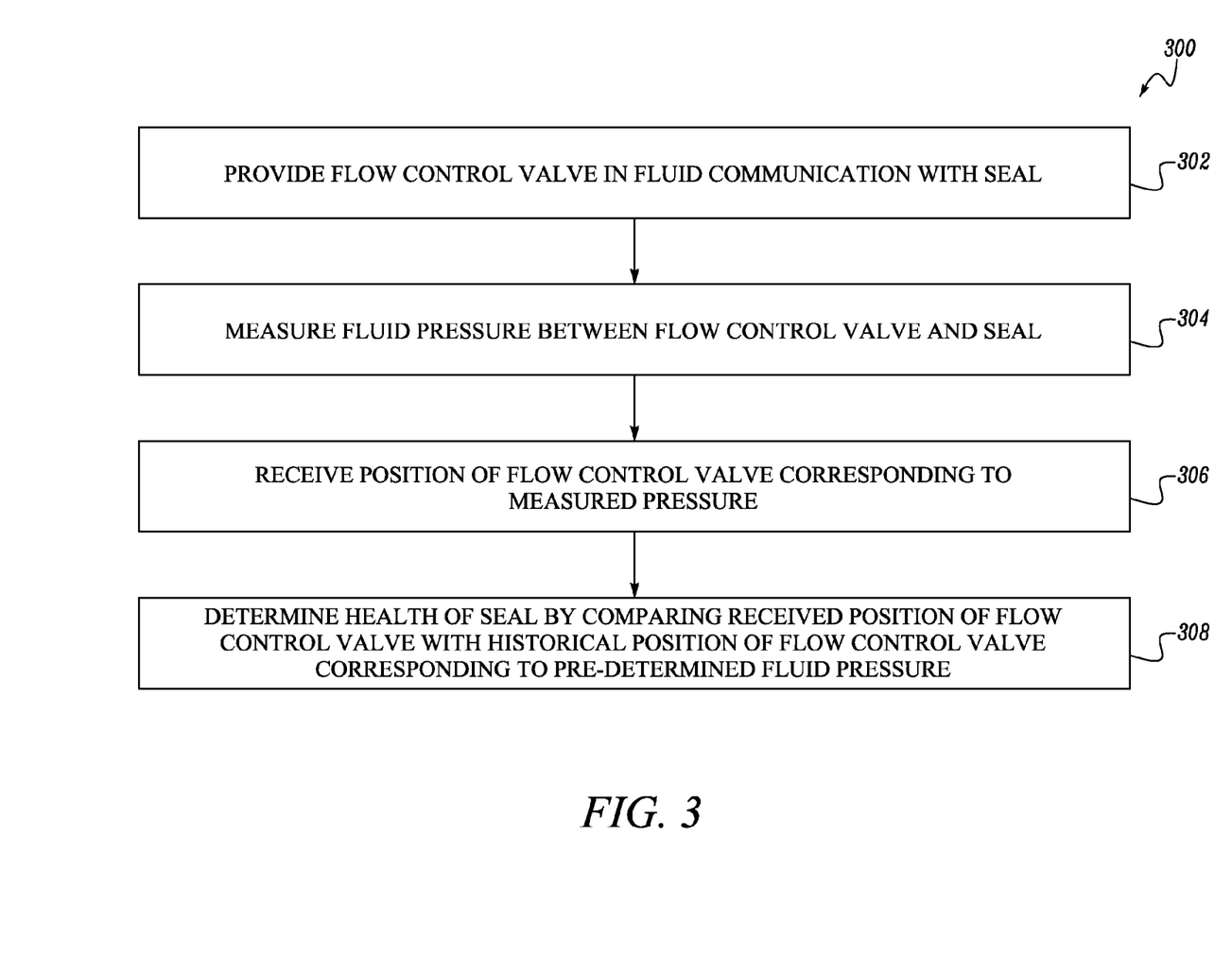
FIG. 3 is a method of monitoring the health of the seal.

FIG. 3 illustrates a method 300 of monitoring the health of the seal 118 i.e. the secondary gas seal 118b in accordance with a specific embodiment of the present disclosure. At step 302, the method 300 includes providing the flow control valve 128 in fluid communication with the secondary gas seal 118b. As shown in FIG. 2, the vent line 122 and the primary vent chamber 124a fluidly couple the flow control valve 128 to the secondary gas seal 118b. Therefore, the vent line 122 and the primary vent chamber 124a dispose the flow control valve 128 in fluid communication with the primary gas seal 118a.

At step 304, the method 300 further includes measuring the fluid pressure between the flow control valve 128 and the secondary gas seal 118b. Referring to FIG. 2, the pressure transducer 126 is located in the vent line 122 between the flow control valve 128 and the secondary gas seal 118b and is hence, configured to measure the fluid pressure of the seal gas between the flow control valve 128 and the secondary gas seal 118b i.e. in the primary vent chamber 124a.

At step 306, the method 300 further includes receiving the position of the flow control valve 128 corresponding to the measured pressure. The measured pressure, disclosed herein, is the pre-determined pressure of fluid in the vent line 122. In an embodiment, the method 300 further includes varying the position of the flow control valve 128 corresponding to the health of the secondary gas seal 118b. Since any change in the health of the p secondary gas seal 118b may tend to change the fluid pressure in the primary vent chamber 124a or the vent line 122, the position of the flow control valve 128 may be varied to maintain the pre-determined fluid pressure between the flow control valve 128 and the secondary gas seal 118b, i.e. in the primary vent chamber 124a and the vent line 122.

At step 308, the method 300 further includes determining the health of the seal by comparing the received position of the flow control valve 128 with a historical position of the flow control valve 128 corresponding to the pre-determined pressure. As disclosed earlier herein, a change in the position of the flow control valve 128 is indicative of a change in the health of the secondary gas seal 118b. In an embodiment as disclosed herein, the historical position of the flow control valve 128 corresponding to the pre-determined fluid pressure may be stored in the controller 134. Therefore, the controller 134 may determine the health of the secondary gas seal 118b by comparing the received position with the historical position stored therein.

Typically, turbo fluid machines such as compressors employ dry gas seals to prevent process fluid from mixing with lubricants associated with one or more bearings and to prevent migration and hence, mixing of process fluid or process gas into lube oil associated with the bearings and/or the lube oil tank. In some cases, the dry gas seals may receive poor quality of seal gas i.e. contaminated seal gas or seal gas with moisture present therein. In other cases, the seal gas may be contaminated by mixing with process fluid in the turbo fluid machine or by mixing with lubricants associated with bearings of the turbo fluid machine. Such occurrences may deteriorate the service life of the dry gas seal over prolonged use and time. Consequently, an operating performance of the turbo fluid machine may be reduced. Further, with absence of a health monitoring system, the deterioration in the health of such dry gas seals may go unnoticed and it may become difficult to achieve optimal or maximum operating performance in the turbo fluid machine.

Although, in some cases, the secondary gas seal 118b may be operable upon deterioration of the primary gas seal 118a beyond a pre-defined limit, an operator may remain unaware of the deterioration in the health of the secondary gas seal 118b.

With implementation of the system 120 disclosed herein, it may be possible to monitor the health of the secondary gas seal 118b closely. In the event of deterioration in the health of the secondary gas seal 118b, the controller 134 receives the position of the flow control valve 128 at the pre-determined pressure. The controller 134 may then compare the received position with the historical position corresponding to the pre-determined pressure. With reference to various embodiments of the present disclosure, it is contemplated that an amount of deterioration in the secondary gas seal 118b may be a function of the deviation in the received position of the flow control valve 128 from the historically known position.

In an embodiment of the present disclosure, the controller 134 may be configured to receive the position of the flow control valve 128 at any instant of time. For example, in some cases, the controller 134 may be configured to receive the position of the flow control valve 128 intermittently i.e., at pre-defined time intervals. In other cases, the controller 134 may be configured to receive the position of the flow control valve 128 continuously. Therefore, the controller 134 may be configured to receive the position of the flow control valve 128 based on any frequency logic preset therein.

Therefore, with use of the present system 120, an operator may be alerted of any premature deterioration or failure of the secondary gas seal 118b. Therefore, the system 120 may assist the operator in closely monitoring any change in the health of the secondary gas seal 118b and allow timely replacement or other service routines to be performed on the secondary gas seal 118b and/or the primary gas seal 118a. Consequently, the system 120 may allow an operator to maintain the turbo fluid machine 100 at its optimum performance level.

While aspects of the present disclosure have been particularly shown and described with reference to the embodiments above, it will be understood by those skilled in the art that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

We claim:

1. A system for monitoring a health of one or more seals, the system comprising:
   a flow control valve located upstream of the one or more seals and disposed in fluid communication therewith, the flow control valve configured to maintain a pre-determined fluid pressure between the flow control valve and the one or more seals; and
   a controller communicably coupled to the flow control valve, the controller configured to:
   receive a position of the flow control valve; and
   determine the health of the one or more seals by comparing the received position of the flow control valve with a historical position of the flow control valve corresponding to the pre-determined fluid pressure.

2. The system of claim 1, wherein a change in the position of the flow control valve is indicative of a change in a state of the health of the one or more seals.

3. The system of claim 1, wherein the controller is further configured to vary a position of the flow control valve to maintain the pre-determined fluid pressure between the flow control valve and the one or more seals.

4. The system of claim 1 further comprising a solenoid communicably coupled to the controller and the flow control valve, wherein the controller is configured to actuate the flow control valve by actuating the solenoid.

5. A turbo fluid machine comprising:
   the system for monitoring a health of one or more seals of claim 1;
   a housing defining an inlet and an outlet;
   a shaft extending longitudinally within the housing and rotatably supported by one or more bearings located outside the housing;
   the one or more seals disposed on the shaft, the one or more seals located adjacent to the one or more bearings; and
   employing the system of claim 1 for monitoring a health of at least one seal from the one or more seals.

6. The turbo fluid machine of claim 5, wherein the at least one seal from the one or more seals is a gas seal configured to prevent a process fluid of the turbo fluid machine from mixing with a lubricant associated with the one or more bearings.

7. The turbo fluid machine of claim 6, wherein the turbo fluid machine is a compressor, and wherein the process fluid and the lubricant are a gas, and a liquid respectively.

8. The turbo fluid machine of claim 5, wherein the one or more seals includes:
   at least one primary gas seal located proximal to the housing; and
   at least one secondary gas seal located between the primary gas seal and the bearings.

9. A system for monitoring a health of one or more seals, the system comprising:
   a vent line located upstream of the one or more seals; and disposed in fluid communication with the one or more seals;
   a pressure transducer disposed in the vent line and configured to measure fluid pressure in the vent line;
   a flow control valve located downstream of the pressure transducer, the flow control valve configured to maintain a pre-determined fluid pressure in the vent line; and
   a controller communicably coupled to the flow control valve, the controller configured to:
   receive a position of the flow control valve; and
   determine the health of the one or more seals based on the received position of the flow control valve, wherein a change in the position of the flow control valve is indicative of a change in a state of the health of the one or more seals.

10. The system of claim 9, wherein the controller is configured to determine a health of the one or more seals by comparing the received position of the flow control valve with a historical position of the flow control valve corresponding to the pre-determined fluid pressure.

11. The system of claim 9, wherein the controller is further configured to vary a position of the flow control valve to maintain the pre-determined fluid pressure in the vent line.

12. The system of claim 9 further comprising a solenoid communicably coupled to the controller and the flow control valve, wherein the controller is configured to actuate the flow control valve by actuating the solenoid.

13. A turbo fluid machine comprising:
   the system for monitoring a health of one or more seals of claim 9;
   a housing defining an inlet and an outlet;
   a shaft extending longitudinally within the housing and rotatably supported by one or more bearings located outside the housing;
   the one or more seals disposed on the shaft, the one or more seals located adjacent to the one or more bearings; and
   employing the system of claim 9 for monitoring a health of at least one seal from the one or more seals.

14. The turbo fluid machine of claim 13, wherein the at least one seal from the one or more seals is a gas seal configured to prevent a process fluid of the turbo fluid machine from mixing with a lubricant associated with the one or more bearings.

15. The turbo fluid machine of claim 14, wherein the turbo fluid machine is a compressor, and wherein the process fluid and the lubricant are a gas, and a liquid respectively.

16. The turbo fluid machine of claim 13, wherein the one or more seals includes:
   at least one primary gas seal located proximal to the housing; and
   at least one secondary gas seal located between the primary gas seal and the bearings.

17. A method of monitoring a health of one or more seals, the method comprising:
   providing a flow control valve in fluid communication with the one or more seals;
   measuring a fluid pressure between the flow control valve and the one or more seals;
   receiving a position of the flow control valve corresponding to the measured fluid pressure; and
   determining the health of the one or more seals by comparing the received position of the flow control valve with a historical position of the flow control valve corresponding to the pre-determined pressure.

18. The method of claim 17 further comprising varying the position of the flow control valve to maintain a pre-determined fluid pressure between the flow control valve and the one or more seals.

19. The method of claim 17, wherein a change in the position of the flow control valve is indicative of a change in a state of the health of the one or more seals.

\* \* \* \* \*